US006763684B2

(12) United States Patent
Pitbladdo (10) Patent No.: US 6,763,684 B2
(45) Date of Patent: Jul. 20, 2004

(54) GLASS HOMOGENIZING PUMP

(76) Inventor: Richard B. Pitbladdo, 411 W. Lake Rd., Hammondsport, NY (US) 14840

( * ) Notice: Subject to any disclaimer, the term of this patent is extended or adjusted under 35 U.S.C. 154(b) by 401 days.

(21) Appl. No.: 09/942,832

(22) Filed: Aug. 30, 2001

(65) Prior Publication Data

US 2002/0023464 A1 Feb. 28, 2002

Related U.S. Application Data

(60) Provisional application No. 60/228,995, filed on Aug. 30, 2000.

(51) Int. Cl.[7] ............................................. C03B 5/187
(52) U.S. Cl. ..................... 65/135.4; 65/135.3; 65/178
(58) Field of Search ............................... 65/135.4, 178, 65/183, 346, 347, 135.3

(56) References Cited

U.S. PATENT DOCUMENTS

| | | | | | |
|---|---|---|---|---|---|
| 1,351,352 | A | * | 8/1920 | Stevens | 366/149 |
| 1,631,061 | A | * | 5/1927 | Rankin | 65/331 |
| 1,927,101 | A | * | 9/1933 | Stenhouse | 65/135.4 |
| 2,072,807 | A | * | 3/1937 | Bailey | 65/129 |
| 2,515,478 | A | * | 7/1950 | Tooley et al. | 65/180 |
| 2,569,459 | A | * | 10/1951 | De Voe | 65/135.4 |

(List continued on next page.)

FOREIGN PATENT DOCUMENTS

| | | |
|---|---|---|
| DE | 19926345 A | 12/1999 |
| EP | 1072 561 A1 | 2/2001 |
| JP | 58-9830 * | 1/1983 |
| JP | 63-008226 | 1/1988 |
| JP | 2-48422 * | 2/1990 |
| JP | 05-229831 | 9/1993 |
| JP | 10287429 | 10/1998 |
| JP | 10338528 | 12/1998 |
| JP | 2001-072426 | 3/2001 |
| SU | XP-992189511 | 2/1990 |
| WO | WO 96 15072 A | 2/1996 |

OTHER PUBLICATIONS

Glass Technology, The glass melting furnace, a special type of chemical; http://www.chem.tue.nl/glasstech/GLASS-FURNACE.htm., Aug. 2001.
Dictionary.Com; Get the Top 10 Most Popular Sites for "tymp"; http://www.dictionary.com/cgi-bin/dict/pl?term=tymp., Jul. 2001.
Dictionary.com; Get the Top 10 Most Popular Sites for "forehearth"; wysiwyg://3/http://www.dictionary.com/cig-bin/dict.pl?term=forehearth, Jul. 2001.
Cable et al., "A quantitative study of the homogenizing of glass melts," *Chemical Engineering Science*, Feb. 1972, 27:409–415.
Parker, N. H., "Liquid Mixing," *Chemical Engineering*, Jun. 1964, p. 166–202.
Spencer et al., "The Mixing of Very Viscous Liquids," *J. Coll. Science*, 1951, 6:133–145, no month available.

Primary Examiner—Sean Vincent
(74) Attorney, Agent, or Firm—Brown & Michaels, PC (57) ABSTRACT

A molten glass pump preferably includes one or more pumps which form either a single-stage apparatus or are combined in series to form a multi-stage apparatus. The exact configuration depends on the required process pressure and the required degree of glass homogenization. Examples of the invention include an auger pump and a mixing auger pump which have varying degrees of mixing action, as well as a homogenizing pump which provides some pumping action but is primarily a homogenizer. All three pumps preferably include a centerline flow recirculation feature which remixes inhomogeneous glass into the incoming glass stream. A counter-rotating sleeve, which straightens the glass flow exiting the apparatus and provides an additional flow recirculation path, is also preferably included.

52 Claims, 9 Drawing Sheets

U.S. PATENT DOCUMENTS

| | | | |
|---|---|---|---|
| 2,570,078 A | 10/1951 | Spremulli | 49/55 |
| 2,641,454 A * | 6/1953 | Labino | 65/134.7 |
| 2,688,469 A * | 9/1954 | Hohmann | 65/135.4 |
| 2,746,729 A * | 5/1956 | Eakins | 65/135.4 |
| 2,762,167 A * | 9/1956 | De Voe | 65/135.4 |
| 2,831,664 A | 4/1958 | Spremulli | 259/107 |
| 3,350,187 A * | 10/1967 | Brichard et al. | 65/135.1 |
| 3,352,659 A | 11/1967 | Rahe | 65/178 |
| 3,723,084 A * | 3/1973 | Colchagoff | 65/135.4 |
| 3,951,635 A | 4/1976 | Rough | 65/135 |
| 3,973,940 A | 8/1976 | Edge et al. | 65/65 |
| 4,004,902 A * | 1/1977 | Pieper | 65/134.2 |
| 4,055,408 A * | 10/1977 | Novak et al. | 65/135.4 |
| 4,099,951 A | 7/1978 | Pieper | 65/135 |
| 4,325,724 A * | 4/1982 | Froberg | 65/474 |
| 4,493,557 A | 1/1985 | Nayak et al. | 366/300 |
| 4,705,550 A | 11/1987 | Canales-Santos et al. | 65/32 |
| 5,120,342 A | 6/1992 | Richards | 65/178 |
| 5,241,558 A | 8/1993 | Nagashima et al. | 373/27 |
| 5,319,669 A | 6/1994 | Cox et al. | 373/29 |
| 5,849,058 A | 12/1998 | Takeshita et al. | 65/134.2 |
| 6,270,248 B1 | 8/2001 | Yoshida et al. | 366/300 |
| 6,286,337 B1 | 9/2001 | Palmquist | 65/157 |

\* cited by examiner

GLASS HOMOGENIZING PUMP

REFERENCE TO RELATED APPLICATIONS

This application claims an invention which was disclosed in Provisional Application No. 60/228,995, filed Aug. 30, 2000, entitled "GLASS HOMOGENIZING PUMP ". The benefit under 35 USC §119(e) of the United States provisional application is hereby claimed, and the aforementioned application is hereby incorporated herein by reference.

BACKGROUND OF THE INVENTION

1. Field of the Invention

The invention pertains to the field of pumps which increase the flow of molten glass through a manufacturing process. More particularly, the invention pertains to a pump that homogenizes and pressurizes the glass for use in production of a high quality glass sheet.

2. Description of Related Art

This invention relates to the manufacture of glass that is currently used for the production of TFT/LCD display devices that are widely used for computers now and are expected to be used for television sets in the future.

Present technology for continuous glass manufacturing processes relies on gravity to facilitate the flow of glass through the forming apparatus to the means of solidification. Additionally, the molten glass must be homogenized by a mixing device. A drawback of present technology is that the flow of glass solely by gravity limits the production rates that can be accommodated by a given factory configuration. The glass melting furnace must be located at a sufficiently higher elevation than the forming apparatus to produce the required pressure for the glass to flow through a given forming apparatus. Once a factory is built, the production limitations are defined.

The flow of glass solely by gravity limits the pressure available for forming glass in new and innovative ways, especially in systems requiring higher pressure. There are practical limitations in locating a glass furnace high above the forming apparatus and ducting the molten glass a large vertical distance to the forming apparatus. Present glass mixers and homogenizers require operation with the outlet flow at atmospheric pressure. The homogenizer must be located in the forehearth at the elevation of the melting furnace. Current homogenizing mixers also produce a trail of poorly homogenized glass that flows off of the bottom tip of the device. This defect is termed "cord" in the glass industry. To a lesser extent, the glass flowing around the device is not thoroughly homogenized.

Therefore, there is a need in the art for a pump which overcomes the shortcomings of the prior art.

SUMMARY OF THE INVENTION

The present invention facilitates the supply of highly homogeneous molten glass at higher than normal pressure to a manufacturing apparatus. This permits an increased range of operation and versatility in manufacturing apparatus design.

The molten glass pump system of the present invention can include one or more pumps, which form either a single-stage apparatus or are combined in series to form a multi-stage apparatus. The exact configuration depends on the required process pressure and the required degree of glass homogenization. Examples of the invention include an auger pump and a mixing auger pump which have varying degrees of mixing action, as well as a homogenizing pump which provides some pumping action but is primarily a homogenizer. All three pumps preferably include a centerline flow recirculation feature which remixes inhomogeneous glass into the incoming glass stream. A counter-rotating sleeve, which straightens the glass flow exiting the apparatus and provides an additional flow recirculation path, is also preferably included.

In the auger pump, an auger, a device which is used primarily for pumping, is used in the molten glass pump. The mixing auger pump utilizes a modified auger with increased homogenizing (mixing) action, but a decreased ability to generate pressure and flow. The mixing auger preferably has periodic cutouts in the auger flights. These cutouts allow glass to pass backward (leak) into another flow path and mix with glass in that passage. The homogenizing pump is primarily a homogenizer, but it also provides some pumping action. The homogenizing pump includes a multitude of propeller blades radially attached to a cylindrical housing. The molten glass is mixed by placing each row of blades so that the flow exiting one row of blades is subdivided as it enters the passages between the next row of blades. Homogenization is accomplished by repetitively subdividing the flow path.

DETAILED DESCRIPTION OF THE INVENTION

Present technology for continuous glass manufacturing processes relies on gravity to facilitate the flow of glass through the forming apparatus to the means of solidification. Additionally, molten glass must be homogenized by a mixing device. By combining these two functions, the present invention has many applications throughout the glass manufacturing industry. The pump facilitates the flow of glass to a forming apparatus at a pressure substantially higher than atmospheric pressure. In a preferred embodiment, the pressure increase capability is preferably greater than or equal to one half Bar. The pressure is regulated by varying the pump rotational speed. For the highest quality glass, the pump is preferably combined with a counter-rotating sleeve and the glass stream is recirculated to prevent defects. Additional pumping stages are optionally added to meet the flow and pressure requirements of a particular manufacturing process.

Glass Manufacturing System

Figure 1:
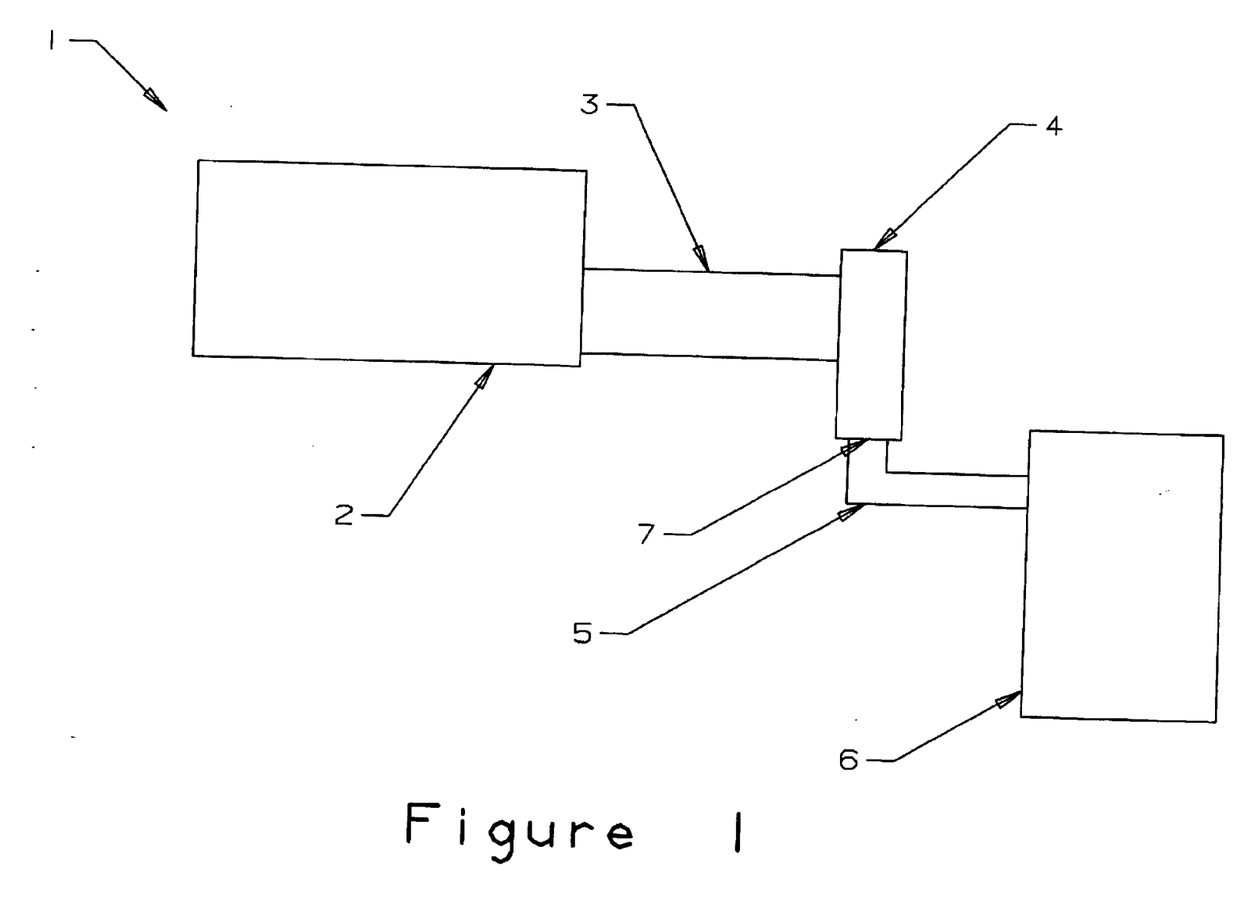
FIG. 1 shows a glass manufacturing process including the molten glass pump of the present invention.

Referring to FIG. 1, all embodiments of the molten glass pump apparatus are preferably located at a free surface in the forehearth (3) of a glass melting system (1). Once melted, glass is transported from the glass melting furnace (2) through the forehearth (3) to the molten glass pump (4). The outlet (7) of the molten glass pump (4) transports the melted glass to the delivery tube (5), which delivers the melted glass into the apparatuses involved in the glass forming process (6). The outlet (7) of the molten glass pump (4) is preferably contained in sealed ducting leading the molten glass to the forming apparatus. Homogenized molten glass is thus delivered to the forming apparatus at an elevated pressure. This pressure can be adjusted over a wide range. This allows utilization of a forming process that can take advantage of these features.

Centerline Recirculation

Figure 2:
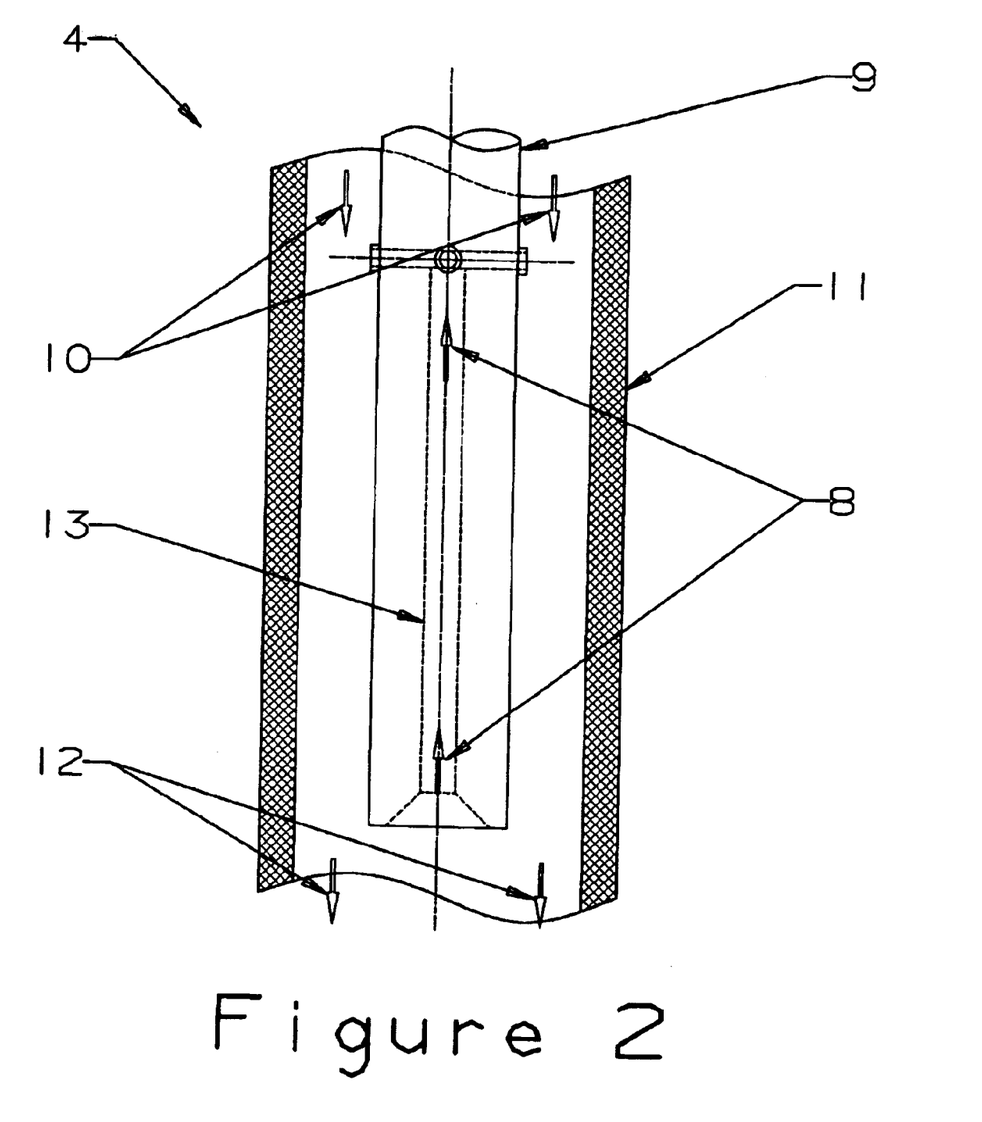
FIG. 2 shows the housing and the rotating hub without its pumping and mixing elements.

Referring also to FIG. 2, a molten glass pump (4) is shown without its pumping and mixing elements. A rotating hub (9), shown here without flights or blades, is found in the center of the molten glass pump (4). A housing (11) houses the rotating hub (9), as well as the pumping and mixing elements of the molten glass pump (4). Glass flows into (10) the molten glass pump (4) from the top, and glass flows out (12) of the molten glass pump (4) at the bottom.

Prior art rotary glass mixing devices produced a trail of poorly homogenized glass created from a stagnant pocket of glass that formed at the rotating tip of the device. Commonly termed a "tip cord" defect or an "auger spot", this defect is a poorly homogenized product that flows along the inner diameter of the pump, accumulates in a pocket at the tip of the blade, and subsequently emanates from the tip of the device. This pocket of glass contains glass that moves slowly through the device and largely avoids the mixing action. This glass is not mixed because of its slow motion through the system.

This glass is often old glass of a slightly different composition than the majority of the molten glass passing through the pump.

In the present invention, centerline recirculation flow of glass (8) through a centerline recirculation channel (13) remixes the glass from the tip of the pumping and/or mixing device into the incoming glass stream, thus eliminating the trail of stagnant glass which forms a cord defect. Centerline recirculation flow (8) is applicable to all embodiments of this invention.

Auger Pump

Figure 3:
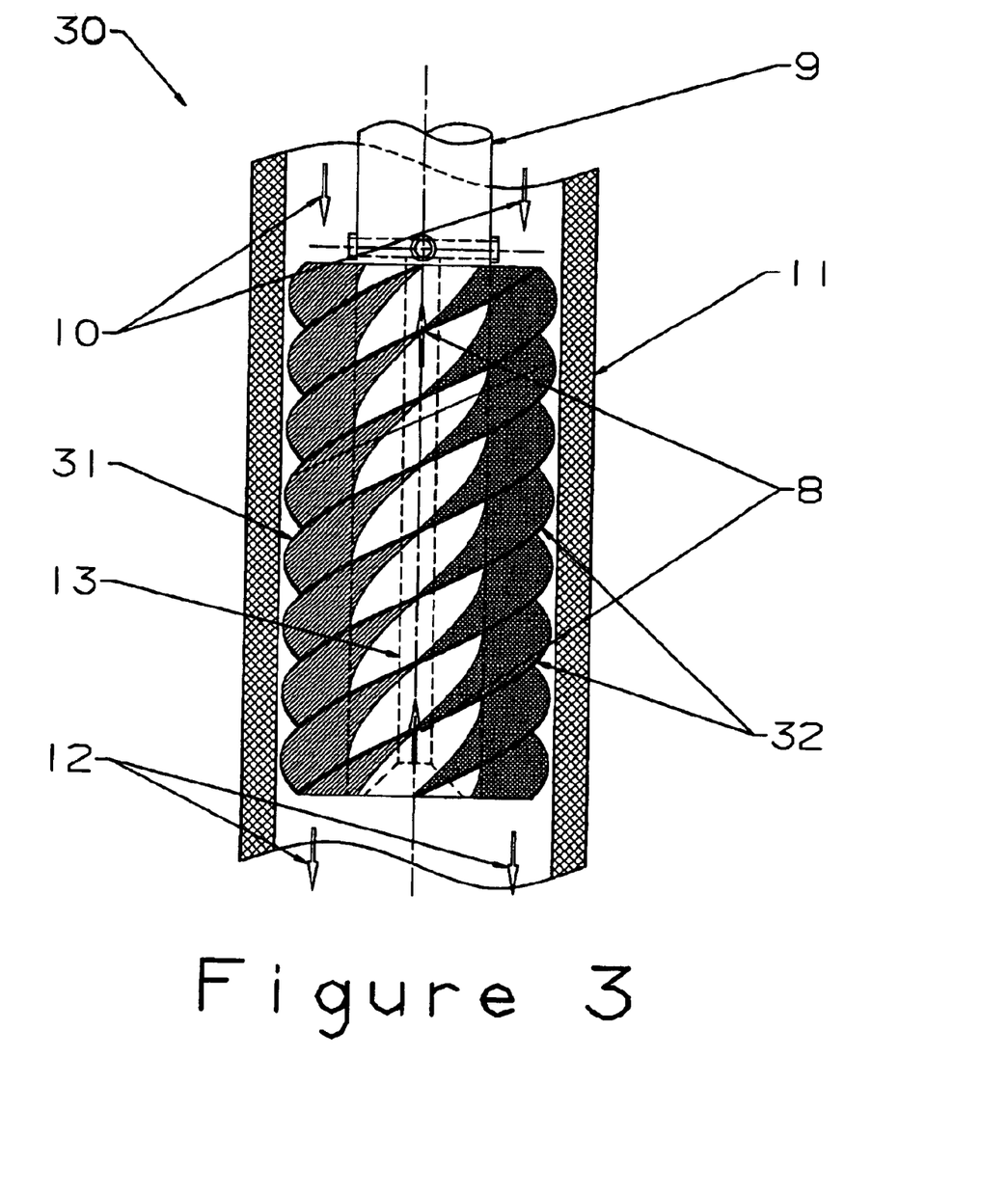
FIG. 3 shows an example of an auger pump with centerline flow recirculation.

Referring also to FIG. 3, an "auger pump" (30) is shown. The primary function of an auger is to pump, which creates pressure and flow. The auger pump (30) also provides limited mixing action. The auger pump (30) includes an auger (31) contained within the housing (11). Augers are common devices used to provide material flow and process pressure for the forming of process materials. The auger (31) includes numerous auger flights (32) which extend radially from an external surface of the rotating hub (9).

Although augers provide some homogenizing action, they are known for the tip cord defect described above. It is common practice to provide small mixing elements at the end of the auger to disperse the tip cord defect. However, for glass, the material in this defect has a different history and often a different material composition than the body stream and therefore requires more widespread dispersion. The auger (31) in the present invention overcomes this problem by recirculating the poorly homogenized glass that flows off the tip of an auger flight (32) through the centerline recirculation channel (13) to the inlet of the auger (31) for rehomogenization into the body of the entire stream.

Mixing Auger Pump

Figure 4:
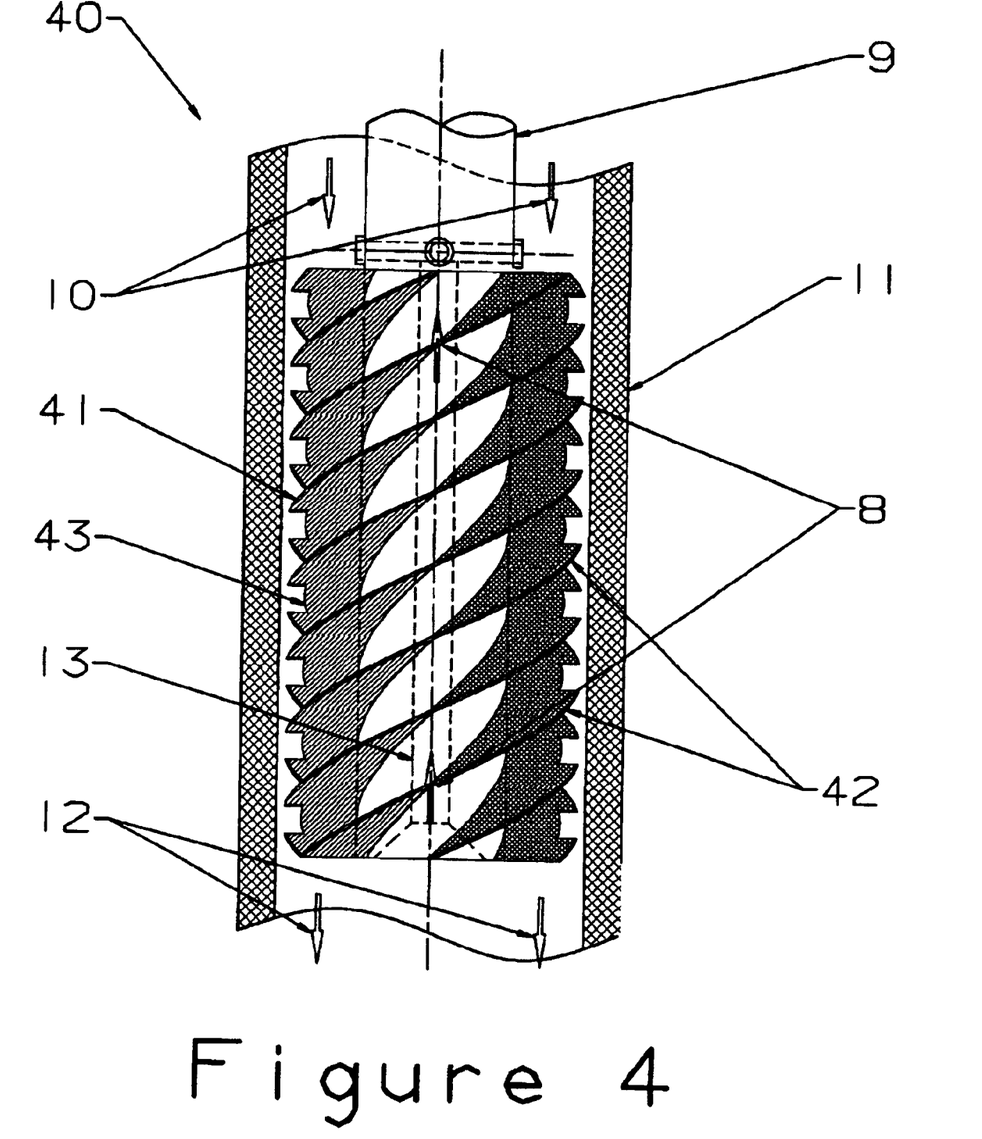
FIG. 4 shows an example of a mixing auger pump with centerline flow recirculation.

FIG. 4 is an example of a "mixing auger pump" (40). The mixing auger pump (40) includes a mixing auger (41) that has been modified to provide increased mixing action with a reduced ability to generate pressure compared to the auger pump (30). A mixing auger (41), which is enclosed in the housing (11), has auger flights (42) extending radially from an external surface of the rotating hub (9). There are preferably cutouts (43) in the auger flights (42). These cutouts (43) allow glass to pass backward (leak) into another flow path and mix with glass in that passage. This provides mixing action, but the backward flow results in lower pumping efficiency.

Homogenizing Pump

Figure 5A:
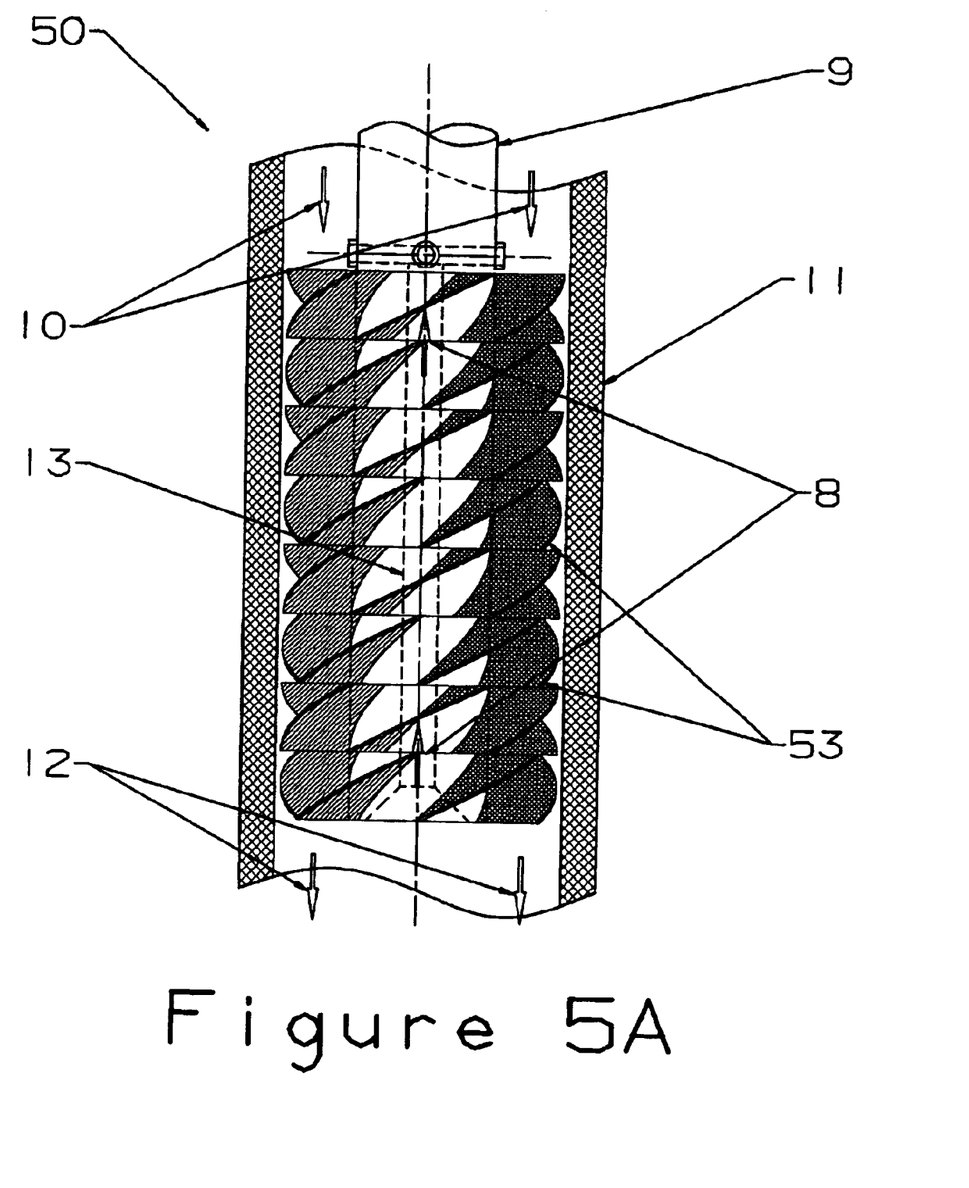
FIG. 5A shows an example of a homogenizing pump with centerline flow recirculation.

FIG. 5A is an example of a "homogenizing pump" (50). Although the homogenizing pump (50) is primarily a mixer, it also provides some pumping action. The homogenizing pump (50) includes a plurality of blades (53) radially attached to an external surface of the rotating hub (9). The rotating hub (9) resembles the compressor of an axial flow gas turbine. This assembly is enclosed in a cylindrical housing (11), which has tight clearance with the blades (53). The blades (53) are preferably all pitched in substantially the same direction similar to an axial compressor. The cylindrical housing (11) and blades (53) are rotated, thus providing the pumping action. The development of pressure and flow in molten glass (a Newtonian Fluid) is substantially different than that in air as with the axial compressor. It is caused by the interaction of the rotating blades (53) and the stationary cylindrical housing (11) that contains the rotating blade system. The motion of the glass, which is substantially downward through the blade system, has a rolling component. Therefore, as the glass passes between any two adjacent blades (53), it is spiraling through the passage.

The key to mixing and homogenizing the molten glass in the homogenizing pump (50) is to place each row of blades (53) so that the flow exiting one set of blades (53), which has been rotated, is divided as it enters the passages of the next set of blades (53). Homogenization is achieved by continuously subdividing the rotated flow. If the flow division were perfect, each successive row of blades (53) would divide the flow path so that the mixing of successive rows would be: times two, times four, times eight, . . . 256, etc. Although Newtonian Fluid does not flow in a manner that produces perfect division, multiple rows of proper aspect ratio and properly placed blades (53) produce excellent mixing with the exception of the glass which is on the very inside diameter of the flow path. The aspect ratio and the placement of the blades is determined by solution of the fluid flow equations (Navier-Stokes) and/or by experimental testing. As in the auger pump (30) and the mixed auger pump (40), poorly homogenized glass is recirculated through the centerline recirculation channel (13) to the entrance end of the homogenizing pump (50) and is mixed thoroughly into the incoming glass stream.

Figure 5B:
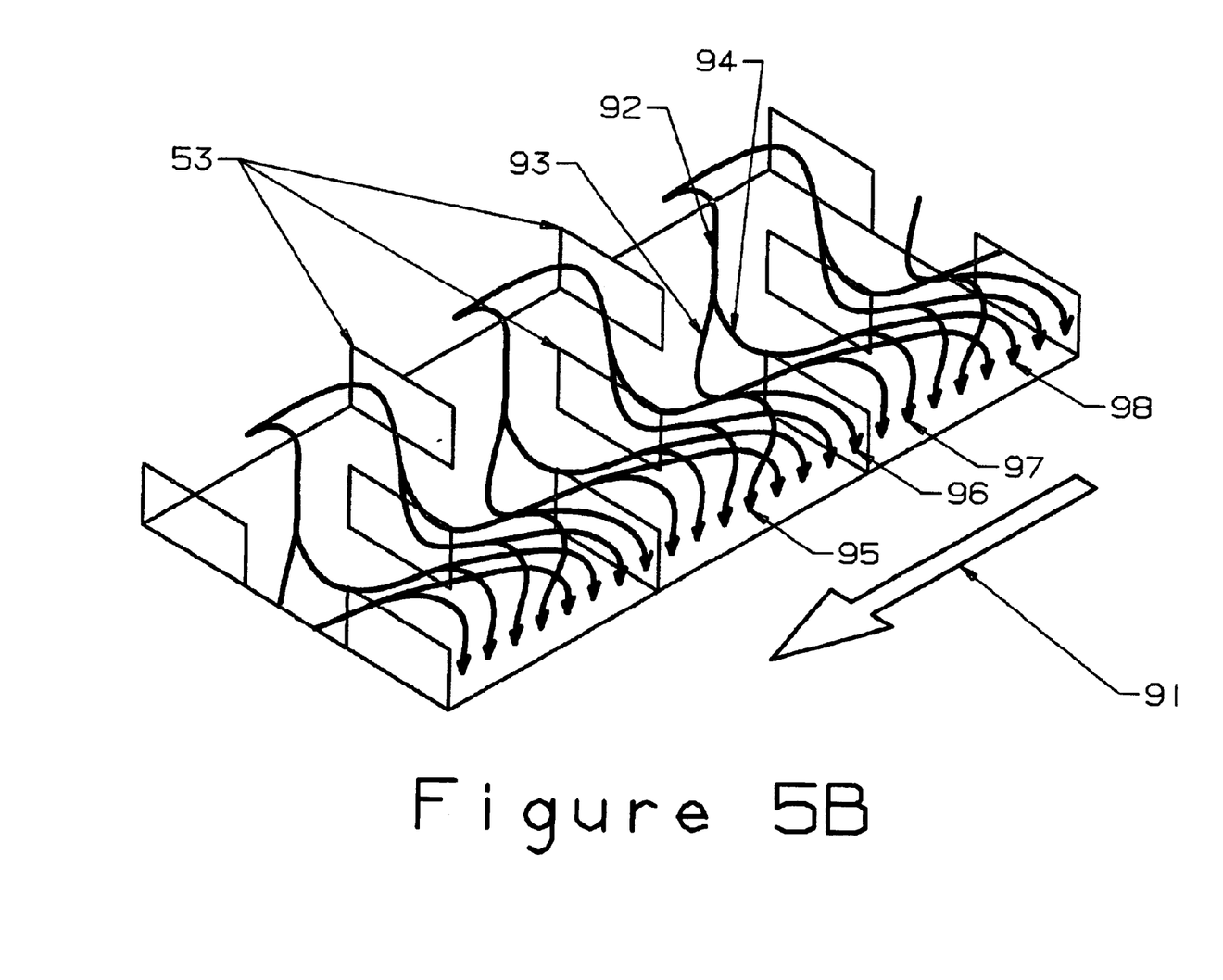
FIG. 5B shows the flow dividing action of the mixing blades of the homogenizing pump shown in FIG. 5A.

FIG. 5B shows the flow dividing action of the mixing blades (53) of the homogenizing pump (50) shown in FIG. 5A. The length of the mixing blades (53) in the direction of glass flow must be sufficient for the glass to rotate at least one half turn in its spiraling motion in order to obtain effective dividing action. One and one half, two and one half, etc. turns would also produce the desired action. The large arrow (91) shows the direction of blade motion in the device. One can follow the flow of molten glass as it is divided. The molten glass (92) is divided into two streams (93) and (94) by the mixing blades (53). Each of these two streams (93) and (94) are then divided again into streams (95) and (96) and (97) and (98), respectively.

Peripheral Recirculation

Referring to FIG. 5A another homogeneity defect (cord) in all of the individual devices described above is the glass that flows through the gap between the housing (11) and the outside diameter tips of the mixing blades (53).

Figure 6:
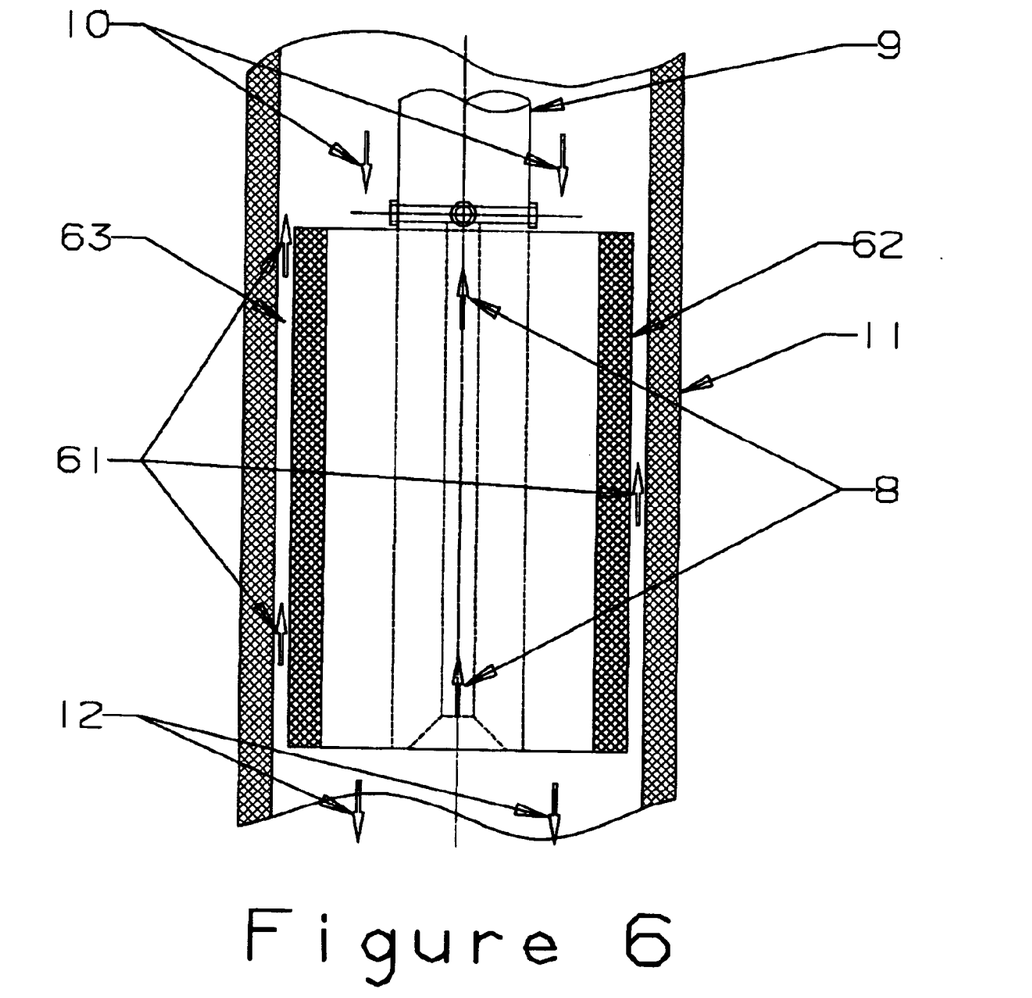
FIG. 6 shows a counter-rotating sleeve with peripheral flow recirculation.

FIG. 6 illustrates peripheral recirculation flow (61) using a counter-rotating sleeve (62) in the molten glass pump. These elements are preferably added to the already established centerline recirculation flow (8) to increase the mixing ability of the molten glass pump. The counter-rotating sleeve (62) is preferably used to further condition the flow out of the molten glass pump to produce the most uniform glass possible. A peripheral portion of the glass melt at the distal end of the molten glass pump is taken up through a peripheral recirculation channel (63), lying between the counter-rotating sleeve (62) and the housing (11), back towards the entrance to the molten glass pump. The peripheral recirculation flow (61) remixes any glass inhomogeneity that is caused by the rotation of the counter-rotating sleeve (62) or emanating from the blade tips of the molten glass pump. Peripheral recirculation flow (61) is an advantage even at zero sleeve rotational speed, due to the small homogeneity defects, which come off of the blade tips.

Counter-rotating Sleeve

Figure 7:
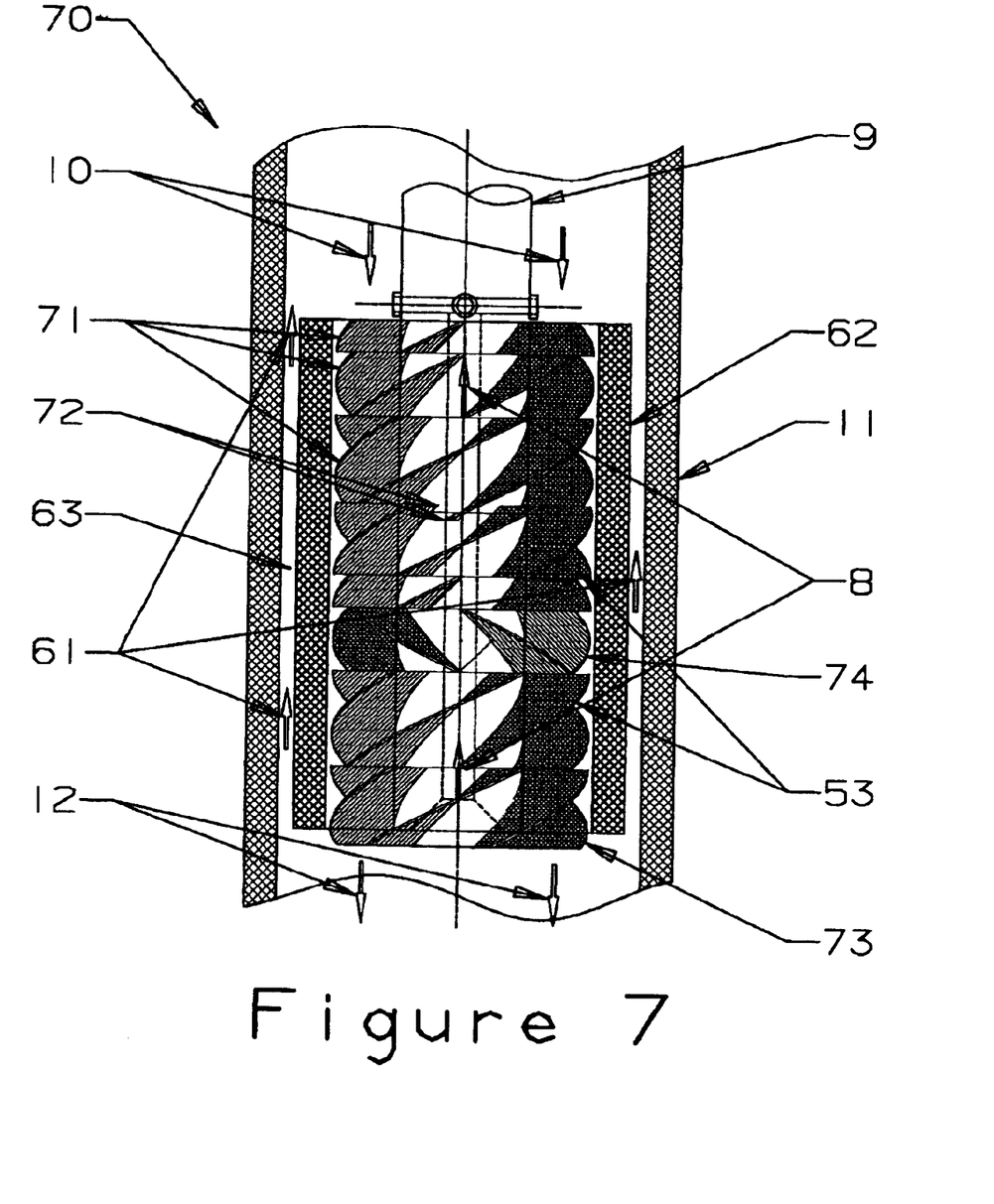
FIG. 7 shows an example of a homogenizing pump contained in a counter-rotating sleeve.

As an example, FIG. 7 shows the mixing elements of the homogenizing pump (70) contained in a counter-rotating sleeve (62). Although the counter-rotating sleeve (62) and peripheral recirculation flow (61) are shown here in relation to the homogenizing pump (70), any of the embodiments could utilize these two components (see FIG. 8). The counter-rotating sleeve (62) straightens the flow of the glass out of the blades (53) of the homogenizing pump (70). Without the counter-rotating sleeve the flow of glass out of the homogenizing pump (50) has a vortex motion caused by the rotation of the hub (9) and blades (53) relative to the housing (11). Introduction of the opposite rotation of the counter-rotating sleeve (62) combined with reducing the rotation speed of the hub (9) and blades (53) straightens the macroscopic vorticity of glass flowing out of the device. The pumping and mixing action is maintained by keeping the relative rotational speed between the hub (9) and blades (53) and the counter-rotating sleeve (62) the same as between the hub (9) and blades (53) and the housing (11).

This embodiment also shows some alternate configurations of the blades (53) of the homogenizing pump (70). Different blade lengths (71), blade overlap (72), and extension of the blades (73) below the rotating hub (9) are all shown. The use of different blade lengths (71) in the same pump facilitates homogenizing performance over a wide range of rotational speeds. Blade overlap (72) and the extension of the blades (73) below the rotating hub (9) affect the homogenizing performance of the pump. Additional blade configurations include, but are not limited to, arranging the blades in a helical pattern or in a partially randomized pattern.

Multi-Stage Device

Figure 8:
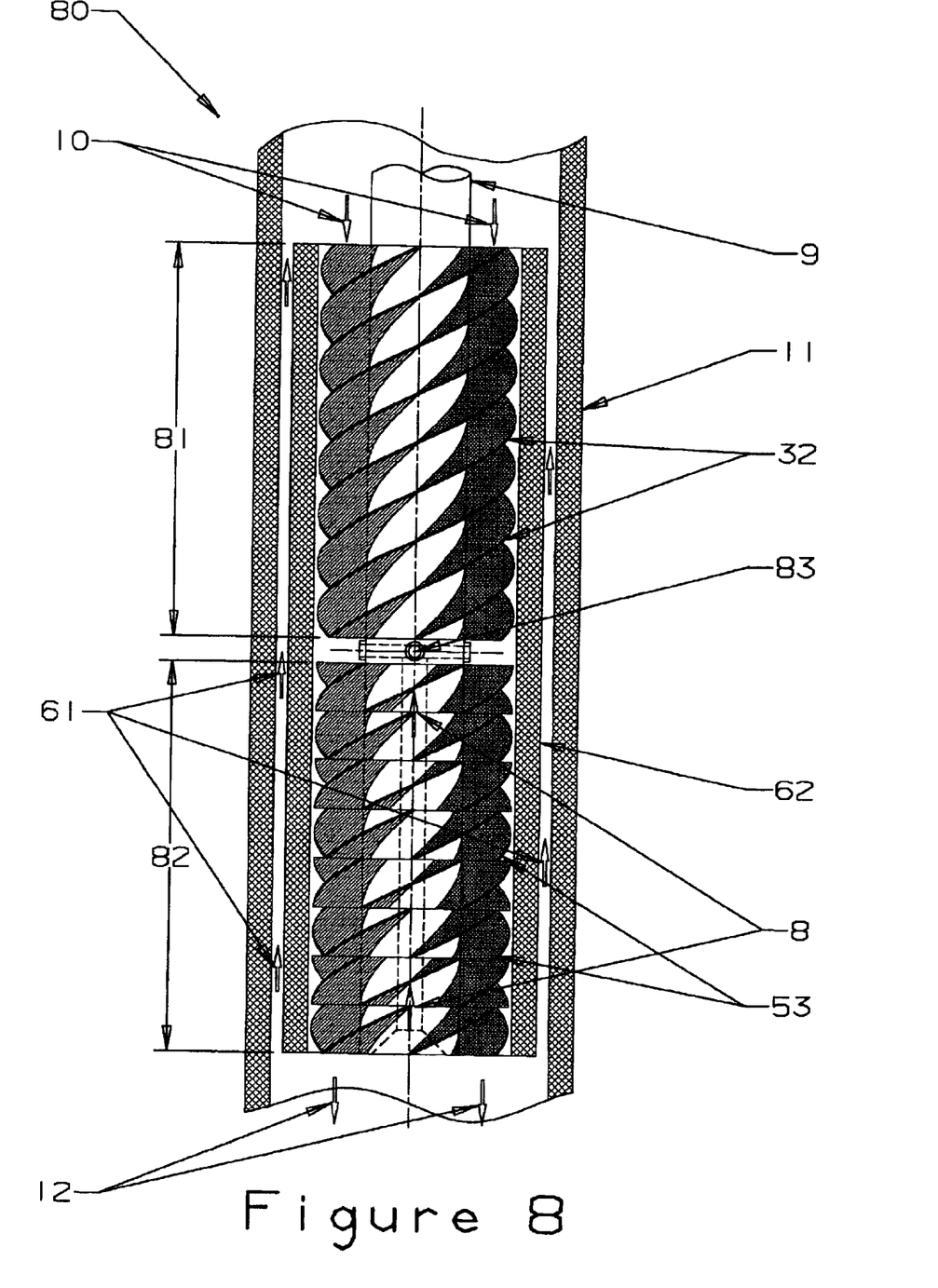
FIG. 8 shows an example of a two-stage device with one auger pump and one homogenizing pump.

FIG. 8 shows an example of a two-stage device (80) with one auger pump stage (81) and one homogenizing pump stage (82). This design would be especially useful in an application where the requirements include both high process pressure and a high degree of glass homogeneity. Process flow and pressure is achieved using the auger pump stage (81), while the homogenizing pump stage (82) effectively mixes the glass.

As in the earlier examples, glass that moves slowly along the inner body of the molten glass pump at the base of the blades comes out of the distal output end of the pump body and forms a tip cord defect. The two-stage device (80) adds a hole (83) in the center of the pump body to return this unmixed glass to an intermediate point in the pump for mixing into the stream. The placement of the hole (83) at an intermediate point in the pump could also be used with the previous embodiments.

These devices may be used singly or coupled in series as a multi-stage device to produce a system which will fulfill the required specifications.

Accordingly, it is to be understood that the embodiments of the invention herein described are merely illustrative of the application of the principles of the invention. Reference herein to details of the illustrated embodiments is not intended to limit the scope of the claims, which themselves recite those features regarded as essential to the invention.

What is claimed is:

1. A method of delivering a pressurized glass melt to a glass forming apparatus, comprising the steps of:
   a) delivering said glass melt through a molten glass pump, such that an output of said glass melt is transferred to said glass forming apparatus;
   wherein said molten glass pump comprises:
      i) a housing having an entrance end for receiving an unpressurized glass melt and a distal output end for outputting a pressurized glass melt; and
      ii) a rotating hub positioned within said housing, said rotating hub including a centerline recirculation channel that traverses the length of said hub and at least one radially extending pumping element; and
   b) intaking a cord portion of said glass melt at said distal output end through said centerline recirculation channel back towards said entrance end.

2. The method of claim 1, further comprising the step of transporting and pressurizing said glass melt, wherein a plurality of auger flights extending radially from an external surface of said rotating hub move the molten glass from the entrance end to the distal end of the pump.

3. The method of claim 1, further comprising the step of:
   c) transporting, pressurizing, and mixing said glass melt, wherein a plurality of auger flights extending radially from an external surface of said rotating hub move the molten glass from the entrance end to the distal end of the pump, said flights including at least one cutout which allow a portion of said glass melt to pass backwards into another flow path thereby mixing said glass melt.

4. The method of claim 1, wherein multiple sets of blades radially attached to an external surface of said rotating hub divide a flow of glass melt exiting a first set of adjacent blades as it enters a passageway of a second set of adjacent blades.

5. The method of claim 1, wherein said molten glass pump further comprises a counter-rotating sleeve having a direction of rotation opposite to that of said rotating hub, said counter-rotating sleeve surrounding said rotating hub and being disposed within said housing with the purpose of eliminating the rotation of the molten glass stream exiting the molten glass pump.

6. The method of claim 5, further comprising the step of uptaking a peripheral portion of said glass melt at said distal end of said molten glass pump back towards said entrance end through a peripheral recirculation channel lying between said counter-rotating sleeve and said housing.

7. The method of claim 1, wherein said molten glass pump further comprises:
   iii) a first stage including a plurality of auger flights extending radially from an external surface of a first-half portion of said rotating hub, wherein said auger flights recirculate any poorly homogenized glass that flows off a tip of the auger flights back into a fluid stream of glass; and
   iv) a second stage including multiple sets of blades that are radially attached to an external surface of a second-half portion of said rotating hub, wherein any two adjacent sets of blades are positioned such that a flow of glass melt exiting a first set of adjacent blades is divided as it enters a passageway of a second set of adjacent blades.

8. The method of claim 7, wherein said molten glass pump further comprises a counter-rotating sleeve having a direction of rotation opposite to that of said rotating hub, said counter-rotating sleeve surrounding said rotating hub and being disposed within said housing.

9. The method of claim 8, further comprising the step of uptaking a peripheral portion of said glass melt at said distal end of said molten glass pump through a peripheral recirculation channel lying between said counter-rotating sleeve and said housing back towards said entrance end.

10. The method of claim 7, wherein said plurality of auger flights comprise at least one cutout allowing a portion of said glass melt to pass backwards into another flow path thereby mixing said glass melt.

11. A glass manufacturing system comprising:
   a) a glass-melting furnace;
   b) a fore hearth connected to said furnace;
   c) a molten glass pump connected to said fore hearth that pressurizes and homogenizes an unpressurized glass melt into a pressurized glass melt, wherein said molten glass pump comprises:
      i) a housing having an entrance end for receiving said unpressurized glass melt and a distal output end for outputting said pressurized glass melt; and
      ii) a rotating hub positioned within said housing, said hub comprising a centerline recirculation channel that traverses the length of said hub and at least one radially extending pumping element, wherein said centerline recirculation channel intakes a cord portion of said glass melt at said distal output end and conducts said cord portion through said centerline recirculation channel back towards said entrance end;
   d) a delivery tube to deliver said pressurized glass melt from said molten glass pump; and
   e) a glass-forming device for receiving said pressurized glass melt from said delivery tube.

12. The glass manufacturing system of claim 11, wherein said rotating hub further comprises a plurality of auger flights extending radially from an external surface of said rotating hub, wherein said auger flights recirculate any poorly homogenized glass that flows off a tip of the auger flights back into a fluid stream of glass.

13. The glass manufacturing system of claim 12, further comprising a counter-rotating sleeve having a direction of rotation opposite to that of said rotating hub, said counter-rotating sleeve surrounding said rotating hub and being disposed within said housing.

14. The glass manufacturing system of claim 13, further comprising a peripheral recirculation channel lying between said counter-rotating sleeve and said housing, wherein a peripheral portion of said glass melt at said distal end of said molten glass pump is conducted through the peripheral recirculation channel back towards said entrance end.

15. The glass manufacturing system of claim 11, wherein said rotating hub further comprises a plurality of auger flights extending radially from an external surface of said rotating hub, wherein said plurality of auger flights include at least one cutout that allows a portion of said glass melt to pass backwards into another flow path thereby mixing said glass melt.

16. The glass manufacturing system of claim 15, further comprising a counter-rotating sleeve having a direction of rotation opposite to that of said rotating hub, said counter-rotating sleeve surrounding said rotating hub and being disposed within said housing.

17. The glass manufacturing system of claim 16, further comprising a peripheral recirculation channel lying between said counter-rotating sleeve and said housing, wherein a peripheral portion of said glass melt at said distal end of said molten glass pump is conducted through the peripheral recirculation channel back towards said entrance end.

18. The glass manufacturing system of claim 11, wherein said rotating hub further comprises multiple sets of blades radially attached to an external surface of said rotating hub, wherein any two adjacent sets of blades are positioned such that a flow of glass melt exiting a first set of adjacent blades is divided as it enters a passageway of a second set of adjacent blades.

19. The glass manufacturing system of claim 18, further comprising a counter-rotating sleeve having a direction of rotation opposite to that of said rotating hub, said counter-rotating sleeve surrounding said rotating hub and being disposed within said housing.

20. The glass manufacturing system of claim 19, further comprising a peripheral recirculation channel lying between said counter-rotating sleeve and said housing, wherein a peripheral portion of said glass melt at said distal end of said molten glass pump is conducted through the peripheral recirculation channel back towards said entrance end.

21. The glass manufacturing system of claim 18, wherein said blades are pitched in one direction.

22. The glass manufacturing system of claim 18, wherein said blades have different lengths.

23. The glass manufacturing system of claim 18, wherein said blades are arranged in a helical pattern around said rotating hub.

24. The glass manufacturing system of claim 18, wherein said blades of a first set of adjacent blades overlap with that of a second set of adjacent blades.

25. The glass manufacturing system of claim 18, wherein said blades are pitched in two directions and at varying pitches.

26. The glass manufacturing system of claim 18, wherein said blades are arranged with varied spacing between said blades.

27. The glass manufacturing system of claim 11, further comprising a counter-rotating sleeve having a direction of rotation opposite to that of said rotating hub, said counter-rotating sleeve surrounding said rotating hub and being disposed within said housing.

28. The glass manufacturing system of claim 27, further comprising a peripheral recirculation channel lying between said counter-rotating sleeve and said housing, wherein a peripheral portion of said glass melt at said distal end of said molten glass pump is conducted through the peripheral recirculation channel back towards said entrance end.

29. The glass manufacturing system of claim 11, wherein said molten glass pump further comprises:
   a) a first stage including a plurality of auger flights extending radially from an external surface of a first-half portion of said rotating hub, wherein said auger flights recirculate any poorly homogenized glass that flows off a tip of the auger flights back into a fluid stream of glass; and b) a second stage including multiple sets of blades that are radially attached to an external surface of a second-half portion of said rotating hub, wherein any two adjacent sets of blades are positioned such that a flow of glass melt exiting a first set of adjacent blades is divided as it enters a passageway of a second set of adjacent blades.

30. The glass manufacturing system of claim 29, further comprising a counter-rotating sleeve having a direction of rotation opposite to that of said rotating hub, said counter-rotating sleeve surrounding said rotating hub and being disposed within said housing.

31. The glass manufacturing system of claim 30, further comprising a peripheral recirculation channel lying between said counter-rotating sleeve and said housing, wherein a peripheral portion of said glass melt at said distal end of said molten glass pump is conducted through the peripheral recirculation channel back towards said entrance end.

32. The glass manufacturing system of claim 29, wherein said plurality of auger flights comprise at least one cutout that allows a portion of said glass melt to pass backwards into another flow path thereby mixing said glass melt.

33. A molten glass pump for pressurizing and homogenizing a glass melt, comprising:

a) a housing having an entrance end for receiving an unpressurized glass melt and a distal output end for outputting a pressurized glass melt; and b) a rotating hub positioned within said housing, said hub comprising a centerline recirculation channel that traverses the length of said hub and at least one radially extending pumping element, wherein said centerline recirculation channel intakes a cord portion of said glass melt at said distal output end and conducts said cord portion through said centerline recirculation channel back towards said entrance end.

34. The molten glass pump of claim 33, wherein said rotating hub further comprises a plurality of auger flights extending radially from an external surface of said rotating hub, wherein said auger flights recirculate any poorly homogenized glass that flows off a tip of the auger flights back into a fluid stream of glass.

35. The molten glass pump of claim 34, further comprising a counter-rotating sleeve having a direction of rotation opposite to that of said rotating hub, said counter-rotating sleeve surrounding said rotating hub and being disposed within said housing.

36. The molten glass pump of claim 35, further comprising a peripheral recirculation channel lying between said counter-rotating sleeve and said housing, wherein a peripheral portion of said glass melt at said distal end of said molten glass pump is conducted through the peripheral recirculation channel back towards said entrance end.

37. The molten glass pump of claim 33, wherein said rotating hub further comprises a plurality of auger flights extending radially from an external surface of said rotating hub, said plurality of auger flights including at least one cutout that allows a portion of said glass melt to pass backwards into another flow path thereby mixing said glass melt.

38. The molten glass pump of claim 37, further comprising a counter-rotating sleeve having a direction of rotation opposite to that of said rotating hub, said counter-rotating sleeve surrounding said rotating hub and being disposed within said housing.

39. The molten glass pump of claim 38, further comprising a peripheral recirculation channel lying between said counter-rotating sleeve and said housing, wherein a peripheral portion of said glass melt at said distal end of said molten glass pump is conducted through the peripheral recirculation channel back towards said entrance end.

40. The molten glass pump of claim 33, wherein said rotating hub further comprises multiple sets of blades radially attached to an external surface of said rotating hub, wherein any two adjacent sets of blades are positioned such that a flow of glass melt exiting a first set of adjacent blades is divided as it enters a passageway of a second set of adjacent blades.

41. The molten glass pump of claim 40, further comprising a counter-rotating sleeve having a direction of rotation opposite to that of said rotating hub, said counter-rotating sleeve surrounding said rotating hub and being disposed within said housing.

42. The molten glass pump of claim 41, further comprising a peripheral recirculation channel lying between said counter-rotating sleeve and said housing, wherein a peripheral portion of said glass melt at said distal end of said molten glass pump is conducted through the peripheral recirculation channel back towards said entrance end.

43. The molten glass pump of claim 40, wherein said blades are pitched in one direction.

44. The molten glass pump of claim 40, wherein said blades have different lengths.

45. The molten glass pump of claim 40, wherein said blades are arranged in a helical pattern around said rotating hub.

46. The molten glass pump of claim 40, wherein said blades of a first set of adjacent blades overlap with that of a second set of adjacent blades.

47. The molten glass pump of claim 40, wherein said blades are pitched in two directions and at varying pitches.

48. The molten glass pump of claim 40, wherein said blades are arranged with varied spacing between said blades.

49. The molten glass pump of claim 33, wherein said rotating hub further comprises:

a) a first stage including a plurality of auger flights extending radially from an external surface of a first-half portion of said rotating hub, wherein said auger flights recirculate any poorly homogenized glass that flows off a tip of the auger flights back into a fluid stream of glass; and b) a second stage including multiple sets of blades that are radially attached to an external surface of a second-half portion of said rotating hub, wherein any two adjacent sets of blades are positioned such that a flow of glass melt exiting a first set of adjacent blades is divided as it enters a passageway of a second set of adjacent blades.

50. The molten glass pump of claim 49, further comprising a counter-rotating sleeve having a direction of rotation opposite to that of said rotating hub, said counter-rotating sleeve surrounding said rotating hub and being disposed within said housing.

51. The molten glass pump of claim 50, further comprising a peripheral recirculation channel lying between said counter-rotating sleeve and said housing, wherein a peripheral portion of said glass melt at said distal end of said molten glass pump is conducted through the peripheral recirculation channel back towards said entrance end.

52. The molten glass pump of claim 49, wherein said plurality of auger flights comprise at least one cutout that allows a portion of said glass melt to pass backwards into another flow path thereby mixing said glass melt.

* * * * *